US008244519B2

(12) United States Patent
Bicici et al.

(10) Patent No.: US 8,244,519 B2
(45) Date of Patent: Aug. 14, 2012

(54) DYNAMIC TRANSLATION MEMORY USING STATISTICAL MACHINE TRANSLATION

(75) Inventors: Ergun Bicici, Istanbul (TR); Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 893 days.

(21) Appl. No.: 12/327,177

(22) Filed: Dec. 3, 2008

(65) Prior Publication Data

US 2010/0138213 A1    Jun. 3, 2010

(51) Int. Cl.
*G06F 17/28* (2006.01)
(52) U.S. Cl. .................. 704/2; 704/4; 704/5; 706/52
(58) Field of Classification Search .......... 704/2, 4, 704/5, 7, 277; 706/8, 52
See application file for complete search history.

(56) References Cited

U.S. PATENT DOCUMENTS

| | | | | |
|---|---|---|---|---|
| 6,278,969 | B1 * | 8/2001 | King et al. | 704/7 |
| 6,345,243 | B1 * | 2/2002 | Clark | 704/2 |
| 6,622,123 | B1 * | 9/2003 | Chanod et al. | 704/277 |
| 7,295,962 | B2 * | 11/2007 | Marcu | 704/2 |
| 7,533,013 | B2 * | 5/2009 | Marcu | 704/2 |
| 7,536,295 | B2 * | 5/2009 | Cancedda et al. | 704/4 |
| 7,707,025 | B2 * | 4/2010 | Whitelock | 704/5 |
| 2002/0188439 | A1 * | 12/2002 | Marcu | 704/5 |
| 2003/0204400 | A1 * | 10/2003 | Marcu et al. | 704/251 |
| 2006/0190241 | A1 * | 8/2006 | Goutte et al. | 704/2 |
| 2007/0150257 | A1 * | 6/2007 | Cancedda et al. | 704/2 |
| 2007/0233460 | A1 * | 10/2007 | Lancaster et al. | 704/9 |
| 2007/0265825 | A1 * | 11/2007 | Cancedda et al. | 704/2 |
| 2009/0326913 | A1 * | 12/2009 | Simard et al. | 704/2 |
| 2010/0082324 | A1 * | 4/2010 | Itagaki et al. | 704/2 |
| 2010/0268527 | A1 * | 10/2010 | Tomeh et al. | 704/4 |
| 2012/0101804 | A1 * | 4/2012 | Roth et al. | 704/2 |

OTHER PUBLICATIONS

Och et al., "A systematic comparison of various statistical alignment models", Computational Linguistics, vol. 29, pp. 19-51 (2003).*
Goutte et al., "Aligning words using matrix factorization", ACL '04: Proceedings of the 42nd Annual Meeting on Association for Computational Linguistics, pp. 502-509 (2004).*
Johnson et al., "Improving Translation Quality by Discarding Most of the Phrasetable," Proceedings of EMNLP, National Research Council of Canada (2007).
Wikipedia, "Fisher's Exact Test," pp. 1-3, at http://en.wikipedia.org/wiki/Fisher%27s_exact_test, Dec. 3, 2008.
Nadi Tomeh, "Filtering of Phrasetables for Statistical Machine Translation Systems," Master Thesis, Jun. 16, 2008.

(Continued)

*Primary Examiner* — Martin Lerner
(74) *Attorney, Agent, or Firm* — Fay Sharpe LLP (57) ABSTRACT

A translation method comprises: retrieving a fuzzy match text segment translation pair from a translation memory (TM) for an input source language text segment, the fuzzy match text segment translation pair comprising a fuzzy source language text segment having a fuzzy match to the input source language text segment and a corresponding translated target language text segment; extracting from the fuzzy match text segment translation pair an exact match phrase pair comprising a source language phrase that exactly matches a phrase of the input source language text segment and a corresponding translated target language phrase; and invoking a statistical machine translation (SMT) system to generate a proposed translation of the input source language text segment based on a statistical translation model that is enriched by the exact match phrase pair with the exact match phrase pair assigned a high statistical probability.

16 Claims, 3 Drawing Sheets

OTHER PUBLICATIONS

Moore, "On Log Likelihood-Ratios and the Significance of Rare Events," Proceedings of the 2004 Conference on Empirical Methods in Natural Language Processing, (2004).

Langlais et al., "Translating with non-contiguous phrases," Proceedings of Human Language Technology Conference and Conference on Empirical Methods in Natural Language Processing (HLT/EMNLP), pp. 755-762, (2005).

Bicici et al., Dynamic Translation Memory: Using Statistical Machine Translation to Improve Translation Memory Fuzzy Matches, Abstract page at http://www.gelbukh.com/cicling/2008/, (Dec. 21, 2007).

Hewavitharana et al., "Augmenting a Statistical Translation System with a Translation Memory," EAMT 2005 Conference Proceedings, XP002576636, Budapest, Hungary, pp. 126-132, May 31, 2005.

Bicici et al., "Dynamic Translation Memory: Using Statistical Machine Translation to Improve Translation Memory Fuzzy Matches," Computational Linguistics and Intelligent Text Processing, vol. 4919, Feb. 2008.

* cited by examiner

```
0    0    0    0    0    0    0    0    0    0    0    0    0    0   NIL
0  196    1    0    1    0    0    2    0    1    1    0    0    0   Install
0    1  179    2    2    1    1    3    2    2    3    2    2    0   the
0    1    2    2    2    1    1    2    2  183    2    1    2    1   lower
0    0    1    1    2    0    2    3  185    2    1    1    2    1   arm
0    0    0    0    2    2  189    2    2    2    1    0    0    0   front
0    0    1    4   90  184    2    4    2    2    1    1    2    1   retaining
0    0    2  182    3    3    2    3    2    2    2    2    2    1   bolt
0    1    3    1    2    1    1    3    1    2  176    2    1    0   in
0    0    0    1    1    1    1    1    1    1    2  182    2    1   two
0    0    1    1    2    2    1    2    2    2    1    2  182    2   stages
0    1    0    1    1    1    1    2    1    1    0    1    2  182

S' = Install the lower arm front retaining bolt in two stages.

T' = Poser la vis de fixation avant de bras inférieur en deux passes.

FIG. 4

S = Install the upper arm front retaining bolt in three stages.

MATRAX = Poser le bras supérieur avant vis de fixation dans trois passes.

TM ENRICHED = Poser la vis de fixation avant de bras supérieur en trois passes.
MATRAX

FIG. 5

DYNAMIC TRANSLATION MEMORY USING STATISTICAL MACHINE TRANSLATION

BACKGROUND

The following relates to the information processing arts, natural language translation arts, document processing and storage arts, and related arts.

Translation of a natural language document from a source language to a target language is presently performed manually or in a semi-automated fashion. In a fully manual approach, a bilingual person who is reasonably fluent in both the source and target languages reads the document written in the source language, and generates (e.g., by typing, voice recognition, or the like) a corresponding electronic translated document that is written in the target language. The fully manual approach is tedious and expensive, especially if the source and/or target language is an uncommon language such that competent bilingual translators are a scarce commodity.

It has been found to be difficult to construct machine translation systems operating on first principles. Most natural languages are highly complex, including features such as idioms (semantic phrases that do not mean what they literally say, e.g. a "figure of speech"), collocations (e.g., specialized word combinations whose meaning is affected by the specific combination), synonyms having fine shades of meaning or subtle connotations, polysemy (words that have more than one possible meaning, with the "correct" meaning typically depending upon context), and so forth.

A tool that has been found to be useful for aiding human translation is the translation memory, which includes a database or storage that stores previously translated source language-target language text segment pairs. A source language text segment to be translated is compared with the translation memory contents to find an already-translated source language text segment that is identical with or similar to the source language text segment under consideration. When an exact or approximate match is found in the translation memory, the corresponding target language text segment is retrieved from the translation memory and presented to the human translator as a proposed translation, for example by inserting the proposed target language text segment into the target language text document being generated by the human translator.

One design parameter of a translation memory system relates to the exactness or fuzziness of the match. If an exact match is found, then it is likely (although not certain) that the human translator will accept the proposed target language text segment as a verbatim or near-verbatim translation. However, exact matches are typically infrequent, and so a translation memory system that requires exact matching tends to provide rather limited assistance to the human translator.

On the other hand, the translation memory system can be configured to accept a "fuzzy" match in which there are some differences between the text segment extracted from the document and a source language text segment stored in the translation memory. These differences may be words in the text segment extracted from the document that are missing from the source language text segment stored in the translation memory; or, additional words in the source language text segment stored in the translation memory may be missing from the text segment extracted from the document, or the same words may be ordered slightly differently in the two text segments, or so forth. By allowing some fuzziness to the match, the translation memory system generates more proposed translations and accordingly is more helpful to the human translator. However, as the match fuzziness increases the likelihood that the human translator will reject the proposed target language text segment, or need to modify it substantially, also increases.

In view of these considerations, it is generally considered useful to allow some fuzziness in the matching performed by the translation memory system. However, it is also understood that the fuzziness of the match usually leads to additional work by the human translator in order to correct the proposed (fuzzy) translation. Indeed, some commercial translation services use the fuzzy match level as a metric for estimating translation cost, with higher charges applying to translation jobs for which the translation memory yields less exact matches on average.

It would be useful to reduce the amount of human editing required to "fix" a fuzzy match. Heretofore, such reduction has been achieved by limiting the allowable fuzziness of the match—however, as already discussed this "solution" results in the translation memory system providing relatively less assistance to the human translator due to fewer identified matches, thus requiring an undesirable tradeoff between number of matches and the average human editing per match.

BRIEF DESCRIPTION

In some illustrative embodiments disclosed as illustrative examples herein, a translation method comprises: retrieving at least one fuzzy match text segment translation pair from a translation memory (TM) for an input source language text segment, the at least one fuzzy match text segment translation pair comprising a fuzzy source language text segment having a fuzzy match to the input source language text segment and a corresponding translated target language text segment; extracting from the at least one fuzzy match text segment translation pair at least one exact match phrase pair comprising a source language phrase that exactly matches a phrase of the input source language text segment and a corresponding translated target language phrase; and invoking a statistical machine translation (SMT) system to generate a proposed translation of the input source language text segment based on a statistical translation model that is enriched by the at least one exact match phrase pair with the at least one exact match phrase pair assigned a high statistical probability.

In some illustrative embodiments disclosed as illustrative examples herein, a translation system comprises: a statistical machine translation (SMT) system configured to generate a proposed translation in a target language for a source language text segment based on a statistical model comprising bi-phrase translation probabilities; a translation memory (TM) including a database of source language-target language text segment translation pairs; and a dynamic translation system configured to invoke the SMT system to generate a proposed translation in the target language for an input source language text segment based on the statistical model enriched by enriching source language-target language translation information that is (i) extracted from the TM and (ii) assigned high statistical probability as compared with the bi-phrase translation probabilities of the statistical model of the SMT system.

In some illustrative embodiments disclosed as illustrative examples herein, a storage medium stores instructions executable by a digital processor to perform translation of an input source language text segment using a statistical machine translation (SMT) system and a translation memory (TM), the method comprising: retrieving at least one translation pair from the TM that has a fuzzy match with the input source language text segment; extracting at least one bi-phrase from the at least one translation pair; and translating the input source language text segment using the SMT system with a statistical model of the SMT system enriched by the extracted at least one bi-phrase.

DETAILED DESCRIPTION

Figure 1:
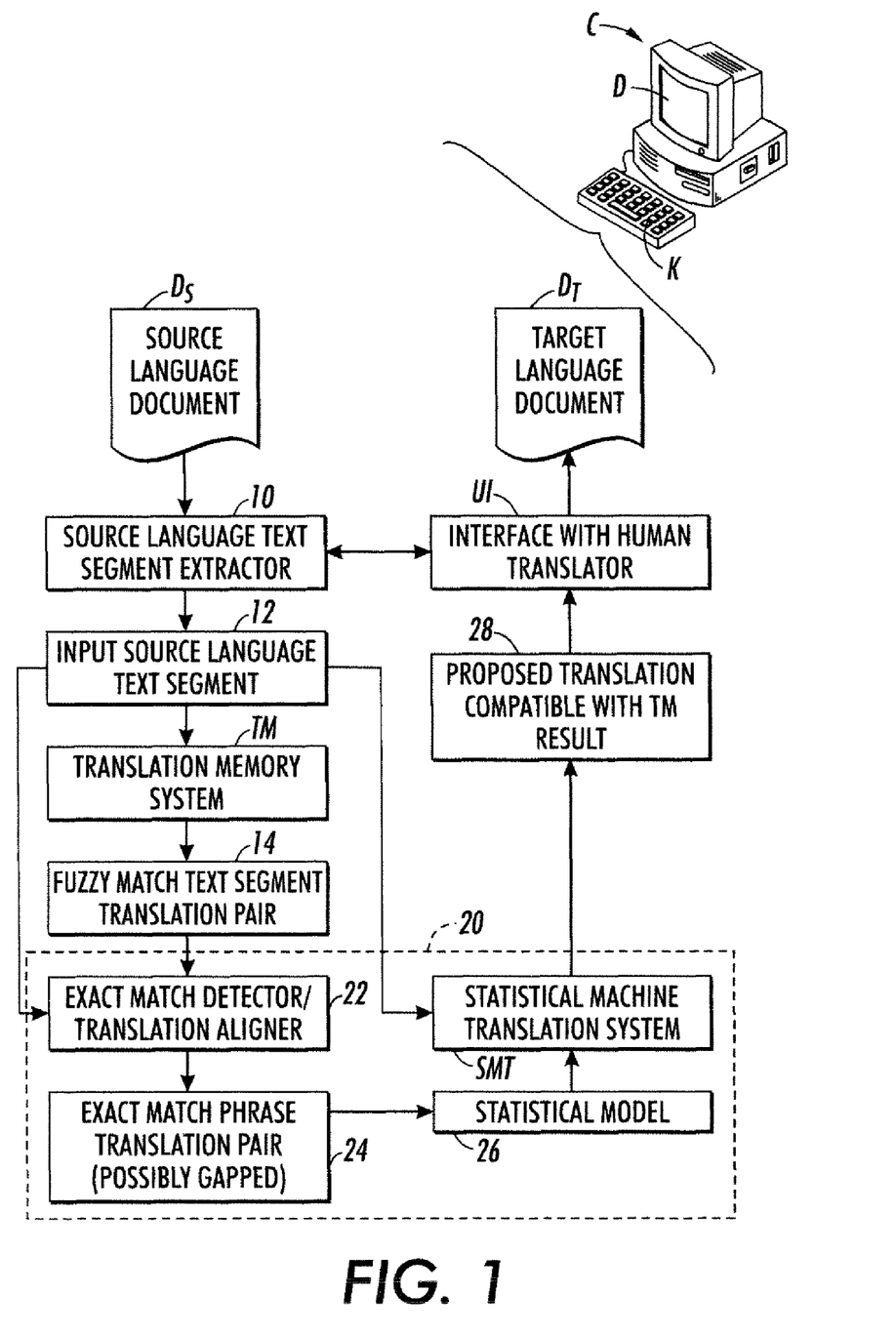
FIG. 1 diagrammatically shows a translation system including automated translation assistance provided by a translation memory (TM) augmented by a statistical machine translation (SMT) system.

With reference to FIG. 1, a document $D_S$ written in a source language is being translated to generate a corresponding translated document $D_T$ written in a target language that is different from the source language. The term "document" as used herein is intended to encompass any textual block, unit, collection, corpora, or so forth, and is not limited to a single text file, word processing document file, or other logical unit. The source and target languages may in general be any two natural languages, such as English, German, French, Russian, Chinese, or so forth. In the case of an alphabetic language such as English, German, French, or Russian, a "word" of the language is an ordered sequence of letters or, in some instances, digits, that represent a vocabulary word, a numerical quantity, or the like. In the case of a language such as Chinese, a "word" of the language is a symbol or group of symbols that correspond to a word of an alphabetic language.

As used herein, the term "text segment" is intended to denote an ordered and contiguous sequence of words in the source language (that is, a "source language text segment") or in the target language (that is, a "target language text segment"). A source language-target language text segment translation pair consists of a source language text segment and a target language text segment where the target language text segment is a translation, or a proposed translation, of the source language text segment. It is to be understood that a text segment translation pair inherently includes a source language text segment and a corresponding translated target language text segment (which may be a proposed translation that has not yet been accepted by the human translator).

The term "ordered" denotes the word ordering as appropriate for the natural language of the text segment. Thus, for example, the German language sometimes places verbs at the end of the sentence which in the corresponding English sentence are located somewhere in the middle of the sentence. In this instance, the ordered German text segment will have the verb at the end whereas the corresponding ordered English text segment will have the word in the middle. The term "text segment" as used herein does not denote any specific grammatical unit, such as a clause, sentence, or the like, although a given text segment may in some instances correspond to a grammatical sentence, clause or the like.

As used herein, a "phrase" is intended to denote an ordered sub-sequence of words of a text segment. The phrase may be a gapped phrase, in which the ordered sub-sequence of words omits interior words of the text segment. For example, a text segment "Jack jumped over the high mountaintop" could have as a phrase "Jack jumped over . . . mountaintop" where the words "the" and "high" are omitted in the phrase. Words can also be omitted at one or both ends of the phrase, as in the phrase " . . . jumped over the high mountaintop".

With continuing reference to FIG. 1, the translation of the source language document $D_S$ to generate the translated target language document $D_T$ is performed or directed by a human translator who generates at least the target language document $D_T$ by typing or otherwise electronically entering or arranging text in the target language via a user interface UI with the human translator. In a typical arrangement, the user interface UI may include a word processor, text editor, or other text input application program. The illustrated embodiment a computer C embodies the translation system and includes illustrated user-interfacing components including a keyboard K and display D. Other suitable user input devices (not illustrated) may include a voice-recognition system; a mouse, trackball, or other pointing device; or so forth.

In some embodiments, the source language document $D_S$ is also an electronic document, and a source language text segment extractor 10 extracts text segments from the electronic source language document $D_S$ for processing, such as automated translation. Alternatively, the source language document $D_S$ can be a hard copy document that is not in electronic form, and source language text segments for processing are manually input by the human translator via the user interface UI.

The human translator is bilingual in the source and target languages, and accordingly is able to perform at least some translation manually via the user interface UI. However, to assist the human translator the illustrated translation system includes a translation memory (TM) system TM that stores a database of source language-target language text segment translation pairs. These text segment translation pairs may be provided as part of a commercially marketed TM system, and/or may include source language-target language text segment translation pairs previously generated by the present human translator or another human translator, and/or may include source language-target language text segment translation pairs automatically extracted from parallel corpora written in the source and target languages using a suitable cross-lingual alignment algorithm. An input source language text segment 12, denoted herein by the symbol S, is written in the source language and is to be translated with the aid of the TM system TM. The input source language text segment S 12 may be extracted from the source document $D_S$ by the source language text segment extractor 10, or may be manually input by the human translator via the user interface UI, or may be otherwise received.

The TM system TM outputs a source language-target language text segment translation pair 14 having a fuzzy match with the input source language text segment 12. As used herein, a text segment translation pair "matching" or "fuzzy matching" the input source language text segment is intended to represent in a shorthand notation that the source language text segment of the text segment translation pair has a match or fuzzy match with the input source language text segment 12. The TM system TM can use any suitable approach for identifying fuzzy matches with the input source language text segment 12. The source language-target language text segment translation pair 14 output by the TM system TM is denoted herein as (S',T') where S' is the source language text segment having a fuzzy match with the input source language text segment S 12 and T' is the translation in the target language of S' stored in the TM system TM.

The matching is fuzzy, so in general S' differs from S, for example by S' having different words, missing words, or additional words as compared with S.

In the illustrated embodiment, a translation system 20 updates the source language-target language text segment translation pair 14 output by the TM system TM in a way that typically reduces or eliminates the differences between S' and S. The translation system 20 includes an exact match detector/translation aligner module 22 that extracts from the fuzzy match text segment translation pair (S',T') 14 an exact match phrase translation pair 24 comprising a source language phrase $P_S$ that exactly matches a phrase of the input source language text segment S 12, and a corresponding translated target language phrase $P_T$. In other words, the source language phrase $P_S$ has an exact match with a corresponding phrase of the input source language text segment. The source language phrase $P_S$ may, in general, be a gapped phrase that omits one or more interior words of the source language text segment S' that do not match with the input source language text segment S 12. The corresponding translated target language phrase $P_T$ is a sub-sequence of the target language text segment T', again possibly gapped.

The exact match phrase translation pair 24 captures the portion of the fuzzy matched source language text segment S' that actually matches the input source language text segment S 12, along with its translation as provided by the TM system TM. It is desirable to "fill in" the missing portion or portions of the input source language text segment S 12 to obtain an improved translation of the input source language text segment S 12.

Toward this end, the exact match phrase translation pair 24 is used to enrich a statistical model 26 that is used by a statistical machine translation (SMT) system SMT to generate a proposed translation of the input source language text segment 12. The SMT system SMT employs the statistical model 26 which provides a database of short word or phrase translation pairs, sometimes collectively referred to herein as "bi-phrases", and statistical probabilities or likelihoods that the target language word or phrase of a given pair or bi-phrase is a correct or acceptable translation of the source language word of the pair or bi-phrase. Statistical machine translation is not rule-based, but rather optimizes a statistical likelihood that a target language text segment is a correct or acceptable translation for an input source language text segment, with the statistical likelihood computed based on the statistical model.

In the illustrated case, the SMT system SMT optimizes a statistical likelihood that a target language text segment is a correct or acceptable translation for the input source language text segment 12, using the statistical model 26 enriched by the exact match phrase translation pair 24 which is assigned a high probability, such as unity or a probability close to unity. With this enrichment of the statistical model 26, the SMT system SMT is very likely (or certain, in the case of certain SMT algorithms and an assigned probability of unity) to generate an optimized translation in the target language that includes the target language phrase $P_T$ of the exact match phrase translation pair 24. Additionally, the optimized translation will have the gaps in the target language phrase $P_T$ "filled in" by content indicated by the statistical model 26 of the SMT system SMT to be a likely translation for the portion or portions of the input source language text segment S 12 that did not match the source language text segment S'. As a result, the optimized translation output by the SMT system SMT includes those portions of the TM system TM output that exactly match the input source language text segment S 12, so as to use all useful information provided by the TM system TM, and improves upon that result by providing likely translation content for any gaps. It should be noted that the "filling in" of any gaps may in some instances entail filling in a gap with a null entry. The examples illustrated herein refer to a single fuzzy match text segment translation pair (S',T') 14 and to a single source language-target language phrase pair $P_S$, $P_T$ extracted from the translation pair (S',T') and used to enrich the SMT decoding. However, it is contemplated to extract more than one exactly matching (and possibly gapped) source language-target language phrase pair from the translation pair (S',T') for use in enriching the SMT statistical model. It is also contemplated to obtain more than one fuzzy match text segment translation pair from the translation memory TM, and to process each fuzzy match text segment translation pair to generate one or more exactly matching (and possibly gapped) source language-target language phrase pairs for use in enriching the SMT statistical model. Each enriching source language-target language phrase pair is assigned a statistical probability that is high as compared with the "standard" bi-phrases of the statistical model. The statistical probabilities assigned to the enriching phrase pairs may all be the same, or may be varied or adjusted to reflect the likelihood that the various phrase pairs are "correct" phrase translations. For example, an enriching source language-target language phrase pair that is extracted from a TM result that has relatively low fuzziness (that is, more exactly matches the input source language text segment S 12) may be assigned a higher statistical probability than another source language-target language phrase pair that is extracted from a TM result that has relatively higher fuzziness.

The optimized translation provided by the SMT system SMT responsive to the input source language text segment S 12 with the statistical model 26 enriched by the exact match phrase translation pair 24 is suitably provided as a proposed translation 28 that is compatible with the TM result 14. This proposed translation 28 is displayed on the display D or is otherwise output to the human translator via the user interface UI. The human translator may accept the proposed translation 28 verbatim, or may edit the proposed translation. Optionally, if the human translator edits the proposed translation then the new text segment translation pair comprising the input source language text segment S 12 and the edited proposed translation are added to the database of the TM system TM.

The TM, SMT, and user interface system components TM, SMT, UI and additional components 10, 22 can be embodied in various ways. In the illustrated embodiment, these components are integrally embodied as software executing on the illustrated computer C. In other embodiments, some or all of the computational components TM, SMT, 10, 22 may be embodied as a server computer that is accessed by the computer C via the Internet or a local area network by a user running the user interface UI on the computer C. Various other arrangements are also contemplated.

As another contemplated embodiment, the computational components TM, SMT, 10, 22 and the user interface UI may be embodied as a unitary handheld translation device, such as a standalone translation device or a suitably programmed general-purpose handheld device such as a cellular telephone or a personal data assistant (PDA). In these latter embodiments, the user may be a monolingual person rather than a human translator, and the user in such embodiments is likely to utilize the handheld device for translation when visiting a country whose native language is unfamiliar to the user.

The disclosed translation systems and methods can also be embodied as a storage medium storing instructions that are executable by the illustrated computer C, or by a PDA or cellular telephone, or by another digital processor to embody an embodiment of the disclosed translation systems or methods. The storage medium may, for example, include: a hard disk drive or other magnetic storage medium; an optical disk or other optical storage medium; a FLASH memory, random access memory (RAM), read-only memory (ROM), or other electronic memory or storage; an Internet server storage; or so forth.

Further aspects are disclosed with the following examples.

In these examples, the SMT system SMT is embodied by a MATRAX SMT system described in Simard et al., "Translating with noncontiguous phrases", in HLT/EMNLP (2005), which is incorporated herein by reference in its entirety. This SMT system employs a log-linear model of the form:

$$Pr(t, a | s) = (1/Z_s) \exp\left(\prod_{m=1}^{M} \lambda_m \phi_m(s, t, a)\right), \quad (1)$$

where the notation is as follows: s is the source language text segment to be translated; t is a target language text segment that is a candidate translation of s; and a is an alignment between s and t.

Figure 2:
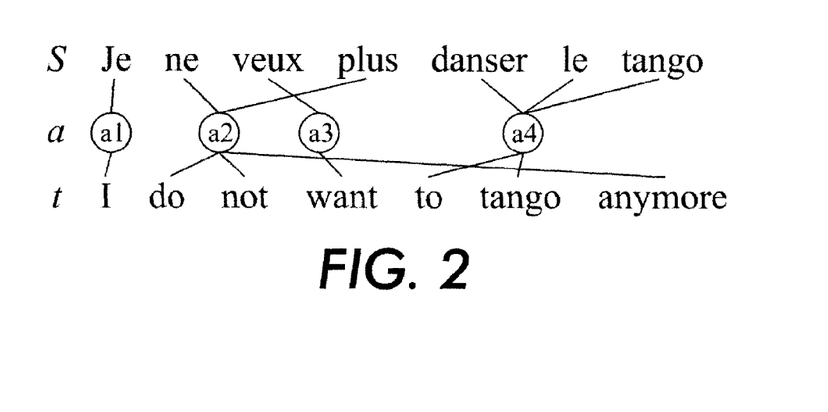
FIG. 2 diagrammatically shows a word alignment for a source language-target language text segment translation pair stored in the TM of FIG. 1.

With brief reference to FIG. 2, in the illustrative MATRAX SMT system the alignment a is represented as a decomposition of (s, t) into a set of bi-phrases. The terms $\phi_m(s,t,a)$ are real-valued features each representing an assessment of the translation candidate (s,t,a) relative to a dimension, such as whether a is composed of high-probability bi-phrases (estimated on a bilingual corpus), or whether the target sentence t is well-formed according to a certain language model, and so forth. The $\lambda_m$ terms are weights balancing the contributions of each aspect, trained from a bilingual development corpus. The $Z_s$ term is a normalization factor. When given a test source text segment s to translate, the decoder of Equation (1) attempts to find a pair (t,a) which maximizes Pr(t,a|s) using a suitable decoding algorithm such as a Viterbi decoding algorithm, and outputs the translation t.

The MATRAX SMT advantageously accommodates non-contiguous bi-phrases, in that it considers pairs of non-contiguous phrases, such as "ne . . . plus"/"not . . . anymore", where "ne . . . plus" is a French-language phrase and "not . . . anymore" is a corresponding English-language phrase. The ellipsis (" . . . ") represents a gap of one or more words, to be filled in at translation time by lexical material provided by some other bi-phrase, or in some instances to be filled in by a null (in effect, eliminating the gap).

The bi-phrases are suitably estimated on the basis of a training corpus of aligned bi-sentences (set), so as to generate the statistical model 26. As a first step in this process, the training procedure produces a matrix describing probable word-level alignments between the source language text segment s and the target language text segment t. See, e.g., Och et al., "A systematic comparison of various statistical alignment models", Computational Linguistics vol. 29 pages 19-51 (2003), which is incorporated herein by reference in its entirety. A method such as nonnegative matrix factorization (see, e.g., Goutte et al., "Aligning words using matrix factorization", in ACL '04: Proceedings of the 42nd Annual Meeting on Association for Computational Linguistics, pages 502-09 (2004), which is incorporated herein by reference in its entirety) is suitably used to group together words that show strong affinities into bi-phrases, including gapped bi-phrases. The bi-phrases are stored as part of the statistical model 26 (also referred to herein as the "static bi-phrase library") along with selected intrinsic features of each bi-phrase ($\tilde{s},\tilde{t}$), such as parameters $\phi_{phr}$ estimate the conditional probability P($\tilde{t}|\tilde{s}$). The training may utilize a bi-phrases corpus extracted from the database of the TM system TM, or can use another corpus.

Although the MATRAX SMT system is employed in the illustrative embodiment, other SMT systems that are capable of employing gapped bi-phrases (so as to be able to be enriched by the exact match phrase translation pair 24 which is possibly gapped) are also contemplated.

An illustrative example of a suitable retrieval process performed by the TM system TM is described. The retrieval process should be configured to return both parts of the fuzzy match text segment translation pair 14. In particular, some TM systems do not output the source language text segment of the fuzzy match text segment translation pair 14. If this is the case, then the TM system should be modified to output the source language text segment as well as the usual target language text segment.

In a suitable TM retrieval process, the database contents are initially indexed for faster retrieval using an inverted word index. Given the input source language text segment 12, candidates for the fuzzy match are selected among those "top-N" source phrases stored in the database of the TM system TM that have the highest number of words in common with the input source language text segment 12 without regard to word ordering. This is analogous to matching "bag-of-words" representations of the input source language text segment 12 and the source language text segments stored in the TM database. The value N is an integer. In some embodiments N=100 is suitable, although the value of N can be 50, 200, or so forth and is not critical. The identified top-N source language text segments have a maximal number of words in common with the input source language text segment 12; however, the ordering of the words may be different. Accordingly, in a second pass the best fuzzy match is identified from the top-N candidate source language text segments as that text segment having a longest common ordered sub-sequence of words matching the input source language text segment 12. That is, a Longest Common Subsequence (LCS) procedure is performed between the input source language text segment S and each of the top-N candidates, and the fuzzy match S' is identified as that text segment for which the corresponding sub-sequence is the longest. In some embodiments, the LCS procedure is modified to control of the maximal size of gaps that are allowed to occur in the sub-sequence. For example, in some embodiments the largest allowable gap in the common sub-sequence is two words. In some embodiments, two or more fuzzy matches S' are selected that have the longest common sub-sequences with the input source language text segment 12. It will be appreciated that if N is set to the size of the translation memory database, then the first operation is effectively eliminated and the LCS procedure would guarantee finding the best match according to the LCS criterion. For values of N that are substantially smaller than the size of the database but which are reasonably large (e.g., N=100), the likelihood is high that the text segment satisfying the LCS criterion over the global database will be one of the top-N fragments as measured by the first (unordered) word match step. The disclosed two-step process therefore usually provides the same result, but more efficiently.

To provide a quantitative example, the input source language (English, in this example) text segment S 12 is taken to be "Install the upper arm front retaining bolt in three stages." Further, it is assumed in this example that the best fuzzy match in the TM system TM is the text segment S'="Install the lower arm front retaining bolt in two stages." for which the fuzzy match level is 82%. The corresponding (translation) target (French) language text segment is T'="Poser la vis de fixation avant de bras inférieur en deux passes." The longest common sub-sequence between the illustrative S and S' is: "Install the . . . arm front retaining bolt in . . . stages." Where each ellipsis (" . . . ") indicates a gap.

Other retrieval algorithms can be used in the TM system TM. Advantageously, however, the illustrative retrieval example given here immediately provides an exactly matching source language phrase that exactly matches a corresponding phrase of the input source language text segment 12. That is, one can immediately set $P_S$ of the exact match phrase translation pair 24 to the LCS identified by the TM matching algorithm disclosed herein. Put another way, when the disclosed TM matching algorithm is used one can integrate the exact match detector portion of the exact match detector/translation aligner module 22 with the fuzzy matching algorithm of the TM system TM. Alternatively, if a different fuzzy matching algorithm is used then the exact match detector/translation aligner module 22 suitably applies the LCS procedure to the fuzzy matching source language text segment S' to generate the exact source language phrase $P_S$.

Some examples of generating the target language phrase $P_T$ are described. In general, it is desired to identify the target language phrase $P_T$ as a phrase of the target language translation T' of the fuzzy match S' that maximally aligns with the exact source language phrase $P_S$.

Figure 3:
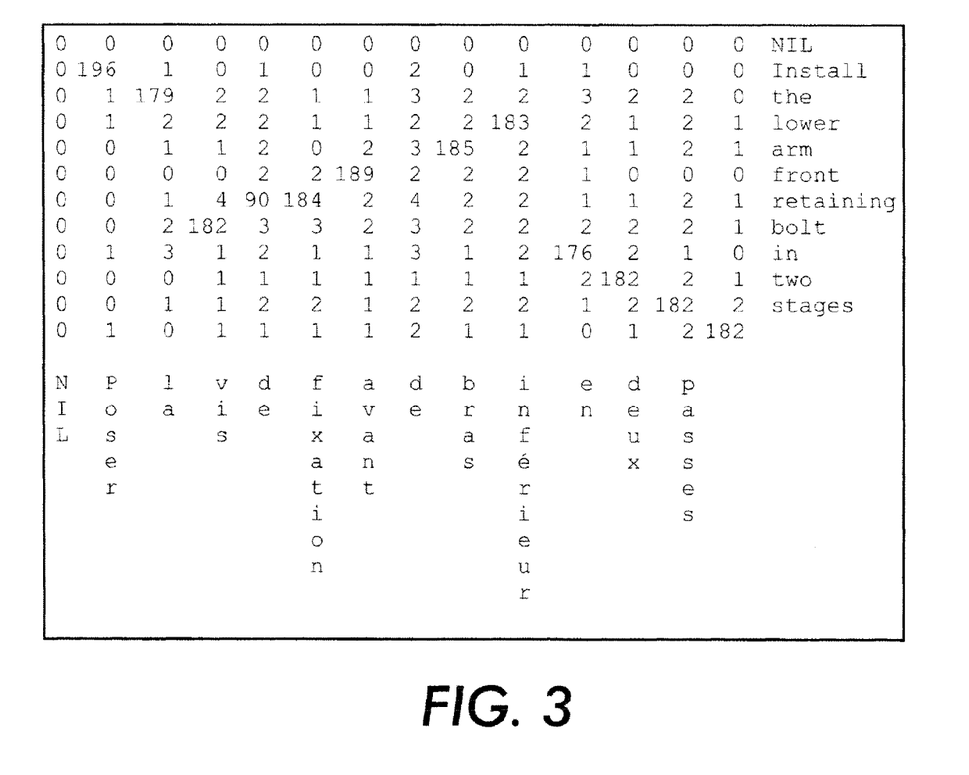
FIG. 3 diagrammatically shows a word alignment matrix whose elements represent word alignment probabilities for a source language-target language text segment translation pair stored in the TM of FIG. 1.

With reference to FIG. 3, in some embodiments of the TM system TM, the TM database includes word alignment information for each text segment translation pair, for example stored in the form of a word alignment matrix. FIG. 3 depicts a word alignment matrix for the illustrative fuzzy match S'="Install the lower arm front retaining bolt in two stages." and its target (French) language text segment T'="Poser la vis de fixation avant de bras inférieur en deux passes." also retrieved from the TM database. If this is the case, then the word alignment information stored in the TM database for the fuzzy match translation pair (S',T') 14 can be utilized. If this information is not stored in the TM database, then word alignment information is suitably generated using a cross-lingual alignment algorithm. Some suitable cross-lingual alignment algorithms are disclosed, for example, in Och et al., "A systematic comparison of various statistical alignment models", Computational Linguistics vol. 29 pages 19-51 (2003), which is incorporated herein by reference in its entirety. FIG. 3 depicts a word alignment matrix suitably generated based on the method of Och et al. by the following operations: produce a top 100 (or, more generally, top-N) forward word alignments for (S',T') as well as the top 100 (or, more generally, top N) backward word alignments for (S',T'); and, combine these alignments in a |S'|×|T'| matrix of counts. This joint word alignment matrix is "symmetrical" relative to source and target language text segments, with each entry being an integer between 0 and 200.

Given the (possibly gapped) exact source language phrase $P_S$, along with a word alignment matrix for the pair (S',T'), it is desired to extract from this information a (possibly gapped) target language phrase $P_T$ that is maximally aligned with $P_S$. In a suitable approach, a list of words denoted TargetWords is set to the empty set Ø. The cell C of the word alignment matrix with the maximal count in identified. If the cell C is associated with a source language word belonging to the exact phrase $P_S$, then the corresponding target word occurrence associated with the cell C is added to the list of words TargetWords. If not, then TargetWords is left unchanged. All cells belonging to the same line or belonging to the same column as the cell C are then eliminated from further consideration. This process is repeated until all cells have been eliminated, or until all words of the phrase $P_S$ have been associated with corresponding target language words. The words in the list of words TargetWords are then collected in their sequential order in the target language text segment T' so as to produce the (possibly gapped) phrase $P_T$. This approach for constructing $P_T$ employs greedy selection maximizing individual source language word-target language word alignments based on the word alignment matrix. Put another way, the approach includes: (i) identifying the largest element of the word alignment matrix that corresponds to a source language word belonging to the source language phrase $P_S$; (ii) adding the target language word associated with the identified element of the word alignment matrix to the list of target language words TargetWords; (iii) repeating the identifying and adding until all source language words of the source language phrase $P_S$ have been associated with target language words; and (iv) defining the translated target language phrase $P_T$ as the list of target language words ordered in the same sequence as in the translated target language text segment T'.

For the illustrative example in which the source language phrase $P_S$="Install the . . . arm front retaining bolt in . . . stages." for the fuzzy match (S',T') having the word alignment matrix depicted in FIG. 3, the described approach yields $P_T$="Poser la vis de fixation avant de bras . . . en . . . passes" where again each ellipsis (" . . . ") represents a gap.

The (possibly gapped) exact match phrase translation pair $(P_S,P_T)$ is then added to the statistical model 26 with a high probability, and the SMT system SMT is applied to the input source language text segment, that is in the illustrative example to the text segment S="Install the upper arm front retaining bolt in three stages." In order to favor the use of the "dynamic" or enriching bi-phrase $(P_S,P_T)$ over other "standard" bi-phrases in the statistical model 26 which may be in competition with it, a strong probability value is assigned to the enriching bi-phrase $(P_S,P_T)$. For the illustrative MATRAX SMT, this is accomplished by setting the feature $\phi_{phr}$ associated with the enriching bi-phrase $(P_S,P_T)$ and which estimates the conditional probability $\Pr(P_T|P_S)$, to a large value or, more generally, to a value that strongly favors selection of the enriching bi-phrase $(P_S,P_T)$. Standard decoding is then resumed with this enriched collection of bi-phrases.

For the illustrative example, the output of the thus enriched MATRAX SMT system is the proposed translation "Poser la vis de fixation avant de bras supérieur en trois passes.". Compared with the translation that would have been suggested by the TM system TM operating alone, namely T'="Poser la vis de fixation avant de bras inférieur en deux passes.", the improved translation has corrected the translation of the English word "upper" from the incorrect French word "inférieur" (a result of S' reciting "lower" instead of "upper") to the correct French word "supérieur". Additionally, the improved translation has corrected the translation of the English word "three" from the incorrect French word "deux" (a result of S' reciting "two" instead of "three") to the correct French word "trois".

The immediately preceding views operation of the translation system 20 as improving upon the initial result output by the TM system TM. Alternatively, however, one can view the translation system 20 as improving operation of the SMT system SMT through enrichment of the statistical model 26 with information from the TM database.

Figure 4:
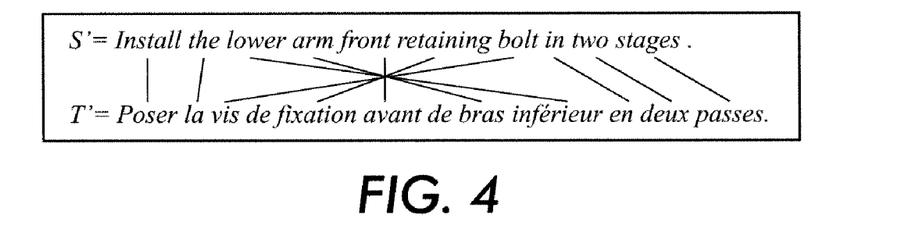
FIG. 4 diagrammatically shows the word alignment for the same source language-target language text segment translation pair as that of FIG. 3.

With reference to FIG. 4, one reason why SMT performance is improved through enrichment of the statistical model 26 with information from the TM database is that the TM database provides substantial information about reordering at the level of word alignments in the text segment translation pair (S',T'). FIG. 4 illustrates the word alignments for the illustrative text segment translation pair (S',T')=("Install the lower arm front retaining bolt in two stages.", "Poser la vis de fixation avant de bras inférieur en deux passes."). It is readily seen in FIG. 4 that the word alignment reordering is extensive. Phrase-based SMT systems such as MATRAX are usually reluctant to generate such complex reorderings, as typically one of the feature functions of the statistical model is designed to limit the amount of reordering between bi-phrases of the source and targets sentences. Another aspect is that the dynamic bi-phrase accounts for a larger portion of the source text segment to be translated than do the (typically smaller) bi-phrases in the static library.

Figure 5:
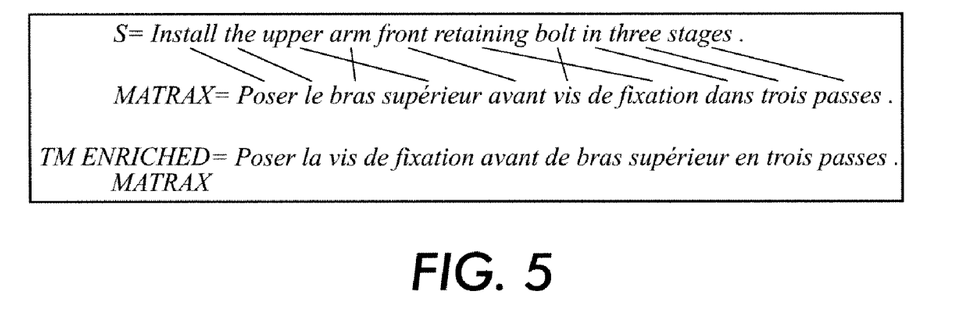
FIG. 5 diagrammatically shows the word alignment generated by performing a statistical machine translation (SMT) alone, without enrichment by information from a translation memory (TM) system, as compared with the translation provided by SMT with enrichment by the TM system.

With reference to FIG. 5, a result of this bias of the SMT against substantial word reordering is illustrated. The top line of FIG. 5 shows the input source language text segment S. The bottom line of FIG. 5 shows the proposed translation 28 output by the system of FIG. 1. The middle line of FIG. 5 shows the translation generated by the MATRAX SMT system operating alone, without enrichment from the TM database. The MATRAX SMT system operating alone was only able to simulate local organization, whereas the system of FIG. 1 which enriches the MATRAX-DTM with information from the TM system effectively exploits global organization in order to account for the substantial word reordering entailed in the illustrative translation. The amount of reordering allowed by MATRAX operating alone is insufficient in this case. On the other hand, increasing the allowable amount of reordering has other detrimental effects on the SMT translation, which is why SMT systems typically include a feature function designed to limit the amount of reordering. Accordingly, the disclosed translation system, such as that of illustrative FIG. 1, improves operation of the SMT system at least because it allows the SMT system to accommodate larger amounts of reordering.

Embodiments of the translation system substantially as depicted in FIG. 1 have been constructed and tested, employing the disclosed MATRAX SMT system and the disclosed two-step retrieval system for the TM. Substantial improvement in translation accuracy was observed for the translation system disclosed herein as compared with either the SMT component operating alone or the TM component operating alone.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A translation method comprising:
   retrieving at least one fuzzy match text segment translation pair from a translation memory (TM) for an input source language text segment, the fuzzy match text segment translation pair comprising a fuzzy source language text segment having a fuzzy match to the input source language text segment and a corresponding translated target language text segment, wherein the retrieving comprises:
      identifying a sub-set of the source language text segments of the TM that have a highest number of words in common with the input source language text segment without regard to word ordering; and
      selecting the at least one fuzzy source language text segment from the sub-set as the text segment in the sub-set based on a longest common ordered sub-sequence criterion;
   extracting from the at least one fuzzy match text segment translation pair at least one exact match phrase pair comprising a source language phrase that exactly matches a phrase of the input source language text segment and a corresponding translated target language phrase; and
   invoking a statistical machine translation (SMT) system to generate a proposed translation of the input source language text segment based on a statistical translation model that is enriched by the at least one exact match phrase pair with the at least one exact match phrase pair assigned a high statistical probability;
   wherein the retrieving, extracting, and invoking operations are performed by a computer.

2. The translation method as set forth in claim 1, wherein the source language phrase of at least one exact match phrase pair comprises a gapped source language phrase.

3. The translation method as set forth in claim 1, wherein at least one source language phrase of at least one exact match phrase pair comprises a gapped source language phrase in which at least one gap accommodates omission of a plurality of words of the fuzzy source language text segment from which the exact match phrase pair is extracted.

4. The translation method as set forth in claim 1, further comprising:
   displaying the proposed translation for review by a human translator.

5. The translation method as set forth in claim 1, wherein the longest common ordered sub-sequence criterion allows for at least one gap of less than N words where N is a selected integer greater than or equal to one.

6. The translation method as set forth in claim 1, wherein the longest common ordered sub-sequence of words generated by applying the longest common ordered sub-sequence criterion defines the at least one source language phrase that exactly matches a phrase of the input source language text segment.

7. The translation method as set forth in claim 1, wherein the extracting comprises:
   constructing a word alignment matrix for the fuzzy match text segment translation pair; and
   selecting the translated target language phrase to maximally align with the source language phrase based on the word alignment matrix.

8. The translation method as set forth in claim 7, wherein the selecting of the translated target language phrase employs greedy selection maximizing individual source language word-target language word alignments based on the word alignment matrix.

9. A translation method comprising:
   retrieving at least one fuzzy match text segment translation pair from a translation memory (TM) for an input source language text segment, the fuzzy match text segment translation pair comprising a fuzzy source language text segment having a fuzzy match to the input source language text segment and a corresponding translated target language text segment;
   extracting from the at least one fuzzy match text segment translation pair at least one exact match phrase pair comprising a source language phrase that exactly matches a phrase of the input source language text segment and a corresponding translated target language phrase wherein the extracting comprises (i) constructing a word alignment matrix for the fuzzy match text segment translation pair and (ii) selecting the translated target language phrase to maximally align with the source language phrase based on the word alignment matrix by operations including:
  identifying the largest element of the word alignment matrix that corresponds to a source language word belonging to the source language phrase;
  adding the target language word associated with the identified element of the word alignment matrix to a list of target language words;
  repeating the identifying and adding until all source language words of the source language phrase have been associated with target language words; and
  defining the translated target language phrase as the list of target language words ordered in the same sequence as in the translated target language text segment; and
invoking a statistical machine translation (SMT) system to generate a proposed translation of the input source language text segment based on a statistical translation model that is enriched by the at least one exact match phrase pair with the at least one exact match phrase pair assigned a high statistical probability;
wherein the retrieving, extracting, and invoking operations are performed by a computer.

10. The translation method as set forth in claim 9, wherein the source language phrase of at least one exact match phrase pair comprises a gapped source language phrase.

11. The translation method as set forth in claim 9, wherein at least one source language phrase of at least one exact match phrase pair comprises a gapped source language phrase in which at least one gap accommodates omission of a plurality of words of the fuzzy source language text segment from which the exact match phrase pair is extracted.

12. A translation system comprising:
  a statistical machine translation (SMT) system comprising a computer programmed to generate a proposed translation in a target language for a source language text segment based on a statistical model comprising bi-phrase translation probabilities wherein the bi-phrase translation probabilities include translation probabilities for at least some gapped bi-phrases;
  a translation memory (TM) including a database of source language-target language text segment translation pairs; and
  a dynamic translation system comprising a computer programmed to:
    extract from the TM an enrichment source language-target language phrase translation pair for which the source language phrase has an exact match with a corresponding phrase of an input source language text segment wherein the dynamic translation system extracts the enrichment source language-target language phrase translation pair by (i) retrieving from the TM at least one source language-target language text segment translation pair that has a fuzzy match with the input source language text segment and (ii) extracting the enrichment source language-target language phrase translation pair from the at least one source language-target language text segment translation pair,
    enrich the statistical model of the SMT system with the enrichment source language-target language phrase translation pair with the enrichment source language-target language phrase translation pair assigned high statistical probability as compared with the bi-phrase translation probabilities of the statistical model of the SMT system, and
    invoke the SMT system by inputting the input source language text segment to the SMT system to cause the SMT system to process the input source language text segment to generate a proposed translation in the target language for the input source language text segment based on the enriched statistical model;
  wherein the retrieving from the TM at least one source language-target language text segment translation pair that has a fuzzy match with the input source language text segment comprises:
    retrieving from the TM a top-N source language-target language text segment translation pairs that have a highest number of source language words in common with the input source language text segment without regard to word ordering; and
    performing fuzzy matching to the top-N source language-target language text segment translation pairs using a longest common ordered sub-sequence criterion in which the longest common ordered sub-sequence can be a non-contiguous sub-sequence.

13. The translation system as set forth in claim 12, wherein the longest common ordered sub-sequence criterion allows for a non-contiguous sub-sequence having gaps of no more than M words where M is a selected integer that is greater than zero.

14. A non-transitory storage medium storing instructions executable by a digital processor to perform a translation method comprising:
  retrieving at least one fuzzy match text segment translation pair from a translation memory (TM) for an input source language text segment, the fuzzy match text segment translation pair comprising a fuzzy source language text segment having a fuzzy match to the input source language text segment and a corresponding translated target language text segment;
  extracting from the at least one fuzzy match text segment translation pair at least one exact match phrase pair comprising a source language phrase that exactly matches a phrase of the input source language text segment and a corresponding translated target language phrase wherein the extracting comprises (i) constructing a word alignment matrix for the fuzzy match text segment translation pair and (ii) selecting the translated target language phrase to maximally align with the source language phrase based on the word alignment matrix by operations including:
    identifying the largest element of the word alignment matrix that corresponds to a source language word belonging to the source language phrase;
    adding the target language word associated with the identified element of the word alignment matrix to a list of target language words;
    repeating the identifying and adding until all source language words of the source language phrase have been associated with target language words; and
    defining the translated target language phrase as the list of target language words ordered in the same sequence as in the translated target language text segment; and
  invoking a statistical machine translation (SMT) system to generate a proposed translation of the input source language text segment based on a statistical translation model that is enriched by the at least one exact match phrase pair with the at least one exact match phrase pair assigned a high statistical probability.

15. The non-transitory storage medium as set forth in claim 14, wherein the source language phrase of at least one exact match phrase pair comprises a gapped source language phrase.

16. The non-transitory storage medium as set forth in claim 14, wherein at least one source language phrase of at least one exact match phrase pair comprises a gapped source language phrase in which at least one gap accommodates omission of a plurality of words of the fuzzy source language text segment from which the exact match phrase pair is extracted.

* * * * *